(12) United States Patent
Gibson

(10) Patent No.: US 10,090,653 B2
(45) Date of Patent: Oct. 2, 2018

(54) CABLE GLAND AND METHOD AND APPARATUS FOR EARTHING A CABLE

(71) Applicant: CAPE Industries, LLC, Liberty, MO (US)

(72) Inventor: Allen Todd Gibson, Liberty, MO (US)

(73) Assignee: Cape Industries, LLC, Liberty, MO (US)

( * ) Notice: Subject to any disclaimer, the term of this patent is extended or adjusted under 35 U.S.C. 154(b) by 0 days.

(21) Appl. No.: 15/787,657

(22) Filed: Oct. 18, 2017

(65) Prior Publication Data

US 2018/0109093 A1 Apr. 19, 2018

Related U.S. Application Data

(60) Provisional application No. 62/409,720, filed on Oct. 18, 2016.

(51) Int. Cl.
| | |
|---|---|
| H02G 3/06 | (2006.01) |
| H02G 15/04 | (2006.01) |
| H01R 13/648 | (2006.01) |
| H02G 15/007 | (2006.01) |
| H02G 1/00 | (2006.01) |

(52) U.S. Cl.
CPC ......... *H02G 3/0625* (2013.01); *H01R 13/648* (2013.01); *H02G 15/043* (2013.01); *H02G 1/00* (2013.01); *H02G 15/007* (2013.01)

(58) Field of Classification Search
CPC ...... H02G 3/0625; H02G 15/043; H02G 1/00; H02G 15/007; H01R 13/648
USPC ............ 174/78, 74 R, 84 R, 59, 652; 439/98
See application file for complete search history.

(56) References Cited

U.S. PATENT DOCUMENTS

| | | | | |
|---|---|---|---|---|
| 1,809,582 | A | * 6/1931 | Church | F16L 19/08 285/154.1 |
| 4,032,205 | A | * 6/1977 | Taj | H02G 15/068 174/78 |
| 4,080,024 | A | * 3/1978 | Kroon | H01R 4/646 174/78 |
| 5,015,804 | A | 5/1991 | Nattel et al. | |
| 5,037,140 | A | * 8/1991 | Anderson | A62C 35/68 285/139.2 |
| 5,310,963 | A | 5/1994 | Kennelly | |

(Continued)

FOREIGN PATENT DOCUMENTS

| | | |
|---|---|---|
| AU | 199652172 | 11/1996 |
| GB | 1280144 | 1/2007 |

OTHER PUBLICATIONS

Cable Glands for Ex Applications; Pratley Ex e Envirogland—For SWA Cable, Pratley Electrical, Factoria, Krugersdorp, South Africa Aug. 11, 2016.

*Primary Examiner* — Harshad C Patel
(74) *Attorney, Agent, or Firm* — Spencer Fane LLP

(57) ABSTRACT

A cable gland and method for earthing, bonding, and electromagnetic capability with armored, metal-clad, and metallic-sheathed cable types. The cable gland includes an adjustable earthing coil arranged internally in a gland body of the cable gland that secures around a cable inserted in the cable gland. When fully coiled, the adjustable earthing coil is relaxed and as the adjustable earthing coil is expanded it generates a restoring force. An earthing strap attached to the adjustable earthing coil in the cable gland, provides grounding capabilities to the cable gland.

27 Claims, 18 Drawing Sheets

(56) References Cited

U.S. PATENT DOCUMENTS

| | | | | |
|---|---|---|---|---|
| 5,491,766 A | * | 2/1996 | Huynh | G02B 6/00 |
| | | | | 385/100 |
| 5,691,505 A | | 11/1997 | Norris | |
| 5,789,706 A | | 8/1998 | Perkins | |
| 5,933,556 A | | 8/1999 | Hawkins | |
| 6,034,325 A | * | 3/2000 | Nattel | H01R 9/03 |
| | | | | 174/59 |
| 8,134,088 B2 | | 3/2012 | Naumann et al. | |
| 8,562,361 B2 | * | 10/2013 | Corbett | H01R 4/26 |
| | | | | 439/100 |
| 8,586,881 B1 | * | 11/2013 | Shemtov | F16L 19/061 |
| | | | | 174/652 |
| 9,178,303 B2 | | 11/2015 | Franke et al. | |
| 9,252,585 B2 | | 2/2016 | Schlachter et al. | |
| 2007/0017688 A1 | | 1/2007 | Pyron et al. | |
| 2009/0149053 A1 | | 6/2009 | Chansrivong | |
| 2011/0147081 A1 | * | 6/2011 | Best | H02G 3/0633 |
| | | | | 174/84 R |
| 2013/0256467 A1 | * | 10/2013 | Aumiller | H02G 3/0666 |
| | | | | 248/49 |
| 2014/0127938 A1 | * | 5/2014 | De France | H01R 9/0512 |
| | | | | 439/567 |
| 2014/0259617 A1 | | 9/2014 | Kompa et al. | |
| 2015/0222107 A1 | | 8/2015 | Jackson | |

* cited by examiner

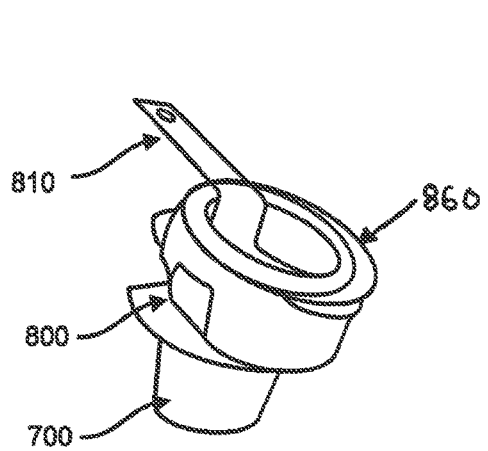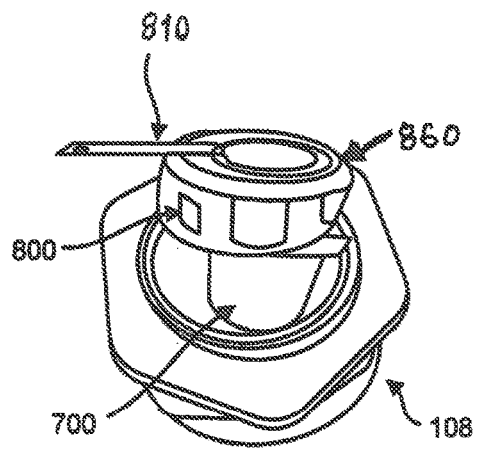
FIG. 8A  FIG. 8B
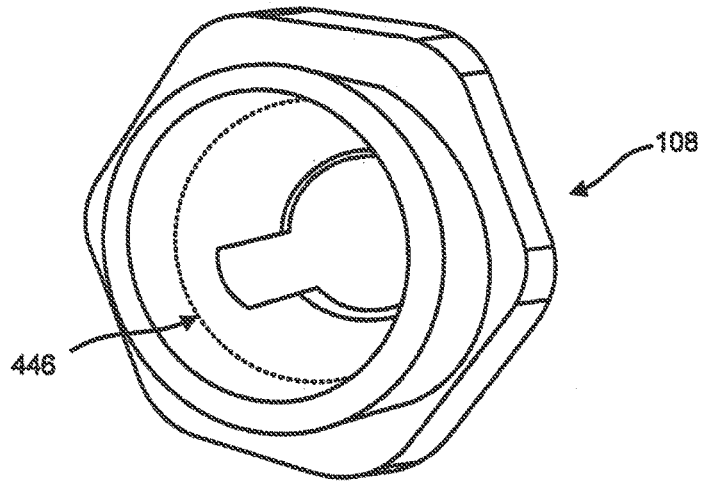
FIG. 8C

CABLE GLAND AND METHOD AND APPARATUS FOR EARTHING A CABLE

CROSS-REFERENCE TO RELATED APPLICATIONS

This application claims benefit of U.S. Provisional Application Ser. No. 62/409,720, filed Oct. 18, 2016, titled CABLE CONNECTOR (CABLE GLAND) FOR EARTHING, BONDING & ELECTROMAGNETIC CAPABILITY WITH ARMORED OR METAL CLAD CABLES which is hereby incorporated by reference in its entirety.

BACKGROUND

1. Field of the Invention

The present invention and disclosed subject matter relate generally to cable glands, also referred to as cable connectors, and the invention more particularly relates to cable glands for earthing, bonding, and electromagnetic capability with armored, metal-clad, and metallic-sheathed cable types.

2. Background

Industrial project designs and installations utilize armored, metal-clad, and metallic-sheathed cables as replacements to fixed rigid-conduit type installations. Conduit systems have historically been used to provide mechanical and environmental protection for cables. These metallic conduit systems are required to be earthed or bonded to provide protection against electrical short-circuit faults. Many different earthing and bonding products exist to meet these needs.

Armored, metal clad and metallic-sheathed cables are an alternative to these rigid-conduit systems, providing flexible metallic jackets which contain the individual cable conductors, providing mechanical and environmental protection, much the same as traditional rigid conduit systems. Armored, metal-clad, and metallic-sheathed cables must also be connected to a device to provide sealing at the point of the cable connection to an electrical enclosure such as a junction box or terminal box. The general purposes of these devices known as cable glands or cable connectors are 1) to protect the cable and the enclosure from environmental elements such as rain and dust, 2) to provide strain relief through cable retention, 3) to provide earthing or bonding as protection against potential short-circuit faults, and 4) to provide electromagnetic capability (EMC), which involves addressing all the issues that may cause unwanted effects such as electromagnetic interference or even physical damage in operational equipment (i.e. interference mitigation). To provide this protection against short-circuit faults and to provide EMC, only metallic cable glands meet these market needs, and there is resistance to the use of non-metallic components in this field. Thus, buyers are left with the high price, heavy weight, and cumbersome installation requirements of using metallic cable glands.

SUMMARY

In accordance with an aspect of the present invention a cable gland is provided comprising: a washer sealant; a second washer; a first washer; an adjustable earthing coil; an outer housing; a gland body; wherein the gland body comprises—a sealing connector disposed in the gland body; a tapered area to be received in the outer housing; and a first set of threads adjacent to the tapered area on the gland body—wherein the outer housing has one or more apertures; and wherein the outer housing, once connected to the gland body, and rotated around the first set of threads on the gland body, is configured to compress the tapered area, allowing the sealing connector to tighten around a cable inserted into the cable gland. The cable gland provides the functions of an environmental seal and also provides for cable retention and strain relief that is critical for the sustained connection of the cable conductors to the termination point(s).

In accordance with another aspect of this invention a method of grounding cables threaded through a non-metallic cable gland that is comprised of a gland body, an outer housing, one or more washers, and an adjustable earthing coil, is provided comprising the steps of: inserting the adjustable earthing coil in one end of the cable gland, allowing an integrated tab of the adjustable earthing coil to protrude out of the cable gland; opening cable receiving apertures at each end of the cable gland; expanding the adjustable earthing coil to a circumference wide enough to receive a cable; inserting the cable through a first aperture of the cable gland, through the cable gland, and out a second aperture of the cable gland; tightening the cable receiving aperture that is opposite of the end where the adjustable earthing coil was inserted, tight enough to hold and secure the cable gland in place on the cable; inserting an anti-short bushing around the cable, but between the armor, metal-cladding, or metal-sheathing of the cables and the individual conductors of the cable, in the area that will connect with the adjustable earthing coil; contracting the adjustable earthing coil inside the cable gland so that it tightens around the cable in the area on the cable that is exposed for grounding; and connecting the integrated tab of the adjustable earthing coil to a grounding element outside of the cable gland.

Thus an object of the present invention is to provide an improved cable gland. Another object of the present invention is to provide an improved earthing coil to assist in grounding cables. Yet another object of the invention is to provide an improved method for earthing cables.

BRIEF DESCRIPTION OF THE DRAWINGS

The invention will now be illustrated in more detail, but not limited, by reference to the specific embodiment shown in the accompanying drawings, with greater emphasis being placed on clarity rather than scale:

FIGS. 8(a) and 8(b) depict views of an earthing insert clamp.

FIG. 8(c) depicts a closer view of the gland body where the earthing insert clamp is inserted and the groove on the gland body that the insert clamp connects to.

DETAILED DESCRIPTION

The present invention and disclosed subject matter relate generally to cable glands, also referred to in the industry as cable connectors, and the invention more particularly relates to cable glands for earthing, bonding, and electromagnetic capability with armored, metal-clad, and metallic-sheathed cable types.

Figure 1A:
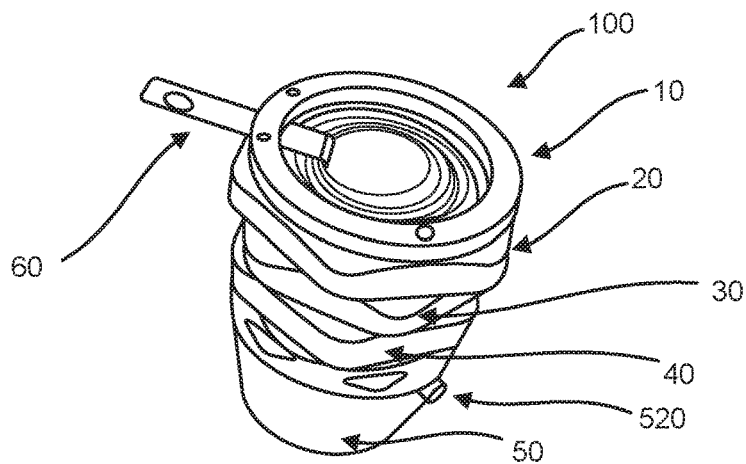
FIG. 1(a) is a perspective view of an assembled cable gland according to an embodiment of the present invention.
Figure 1B:
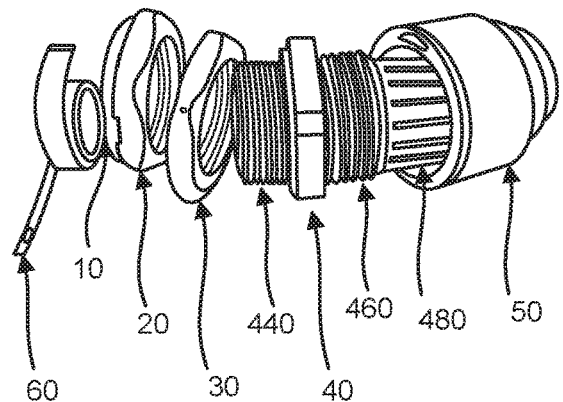
FIG. 1(b) is a perspective view of a disassembled cable gland according to an embodiment of the present invention.
Figure 1C:
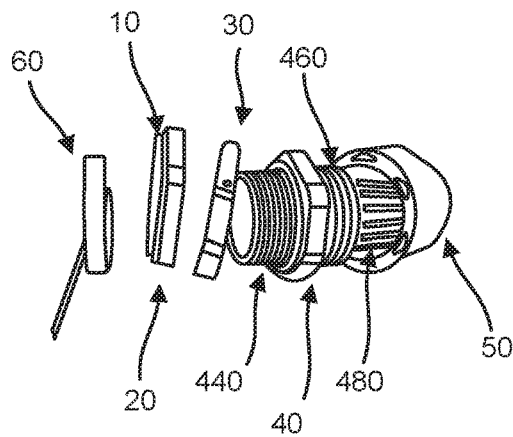
FIG. 1(c) is another perspective view of a disassembled cable gland according to an embodiment of the present invention.
Figure 4A:
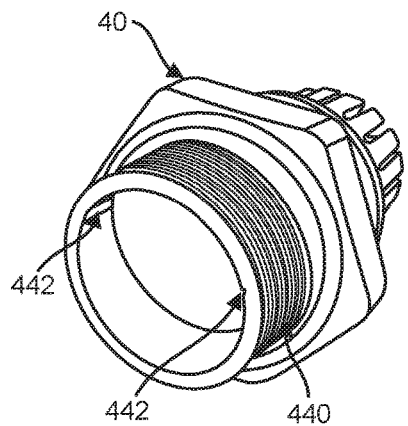
FIGS. 4(a)-4(e) are different perspective views of a gland body according to an embodiment of the present invention.
Figure 4B:
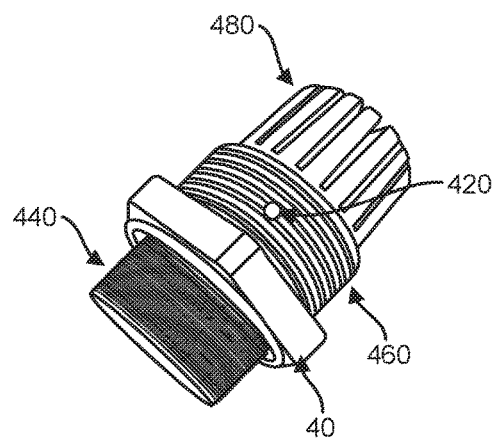
Figure 4C:
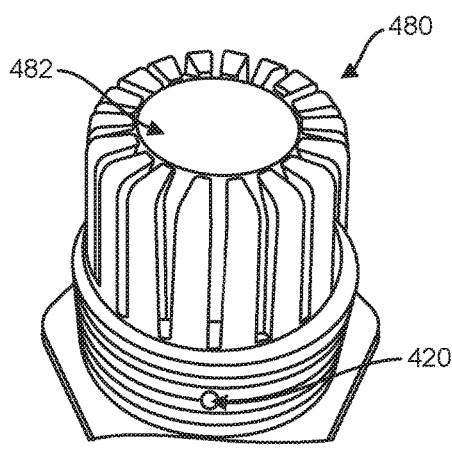
Figure 4D:
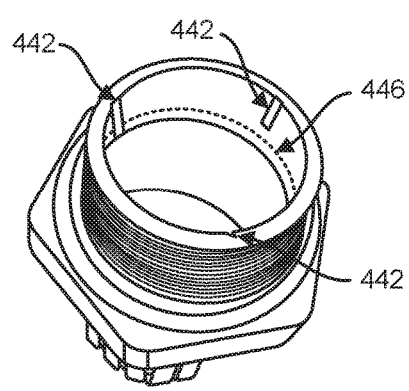
Figure 4E:
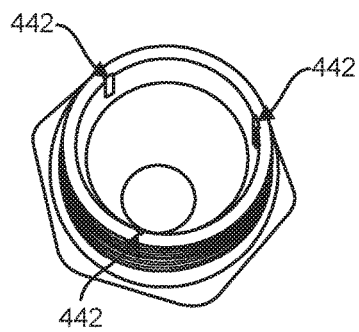
Figure 5A:
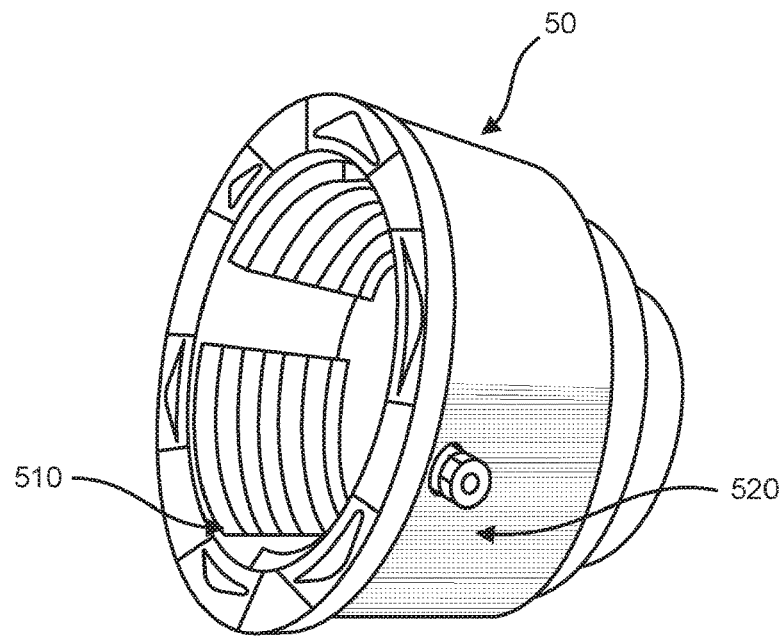
FIG. 5(a) depicts a side view of an outer housing according to an embodiment of the present invention.
Figure 5B:
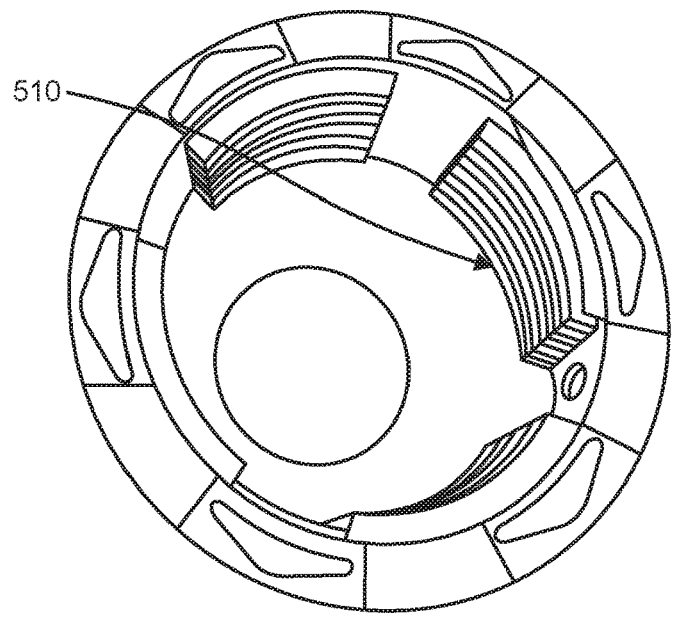
FIG. 5(b) depicts an aerial view of an outer housing according to an embodiment of the present invention.

In FIG. 1(a) a perspective top view of an embodiment of an assembled cable gland 100 according to the invention is represented. The cable gland 100 comprises a gland body 40, an outer housing 50 arranged externally at a tapered end 460 of the gland body 40, a first washer 30 arranged externally on the gland body 40, a second washer 20 arranged externally on the gland body 40, a washer sealant 10 arranged externally on the gland body 40, and an adjustable earthing coil 60 arranged internally in the gland body 40. The gland body 40 comprises a second set of threads 440 connected to one end of the gland body 40 and a first set of threads 460 connected to the opposite end of the gland body 40. The gland body 40 further comprises a tapered area 480 adjacent to the first set of threads that interacts with the outer housing 50, see FIG. 1(b) and FIG. 1(b). FIG. 4(c) depicts a sealing connector 482 disposed within the tapered area 480 of the gland body 40. The gland body 40, also has at least one release mechanism 420 disposed on the first set of threads 460 on the gland body 40. In an embodiment, the gland body 40 further comprises one or more grooves or notches 442 around inside perimeter of the gland body 40, see FIG. 4(d). In an embodiment, the grooves or notches 442 around the inside perimeter of the gland body 40 are formed from different shapes, depths, and widths. In another embodiment, the gland body 40 further comprises a thin ledge or shelf 446 wrapping around the inner circumference of the gland body 40. FIG. 5 depicts the outer housing 50 that interacts with the gland body 40. The inside of the outer housing 50 is comprised of threads 510. The outer housing 50 if further comprised of at least one or more apertures 520. In an embodiment of the current invention, the cable gland 100 further comprises an anti-short bushing 700, see FIG. 8.

Figure 6A:
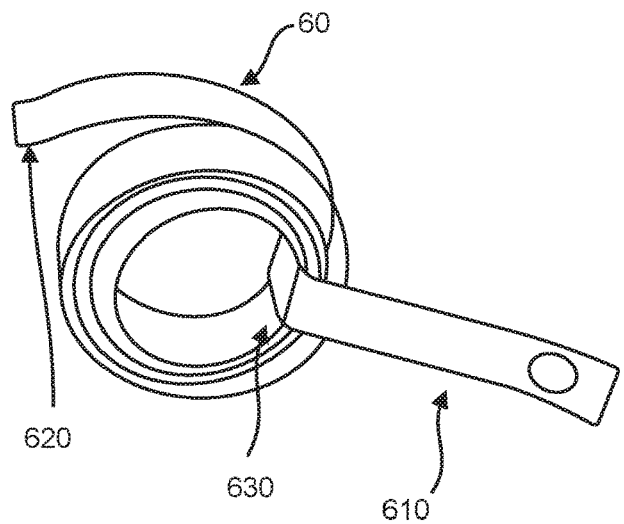
FIG. 6(a) depicts an adjustable earthing coil according to an embodiment of the present invention.
Figure 6B:
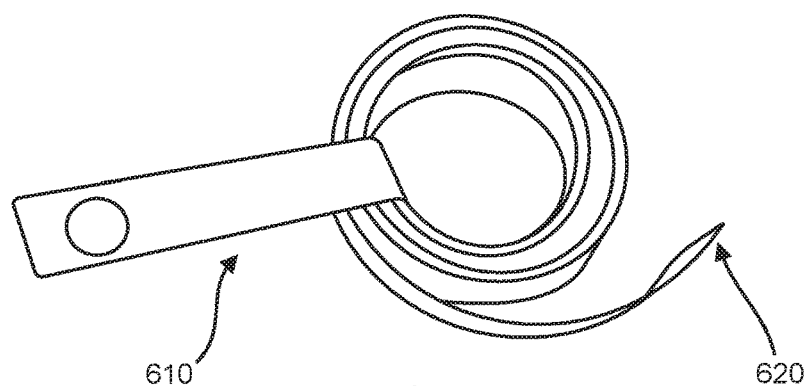
FIG. 6(b) depicts another perspective of the adjustable earthing coil according to an embodiment of the present invention.
Figure 6C:
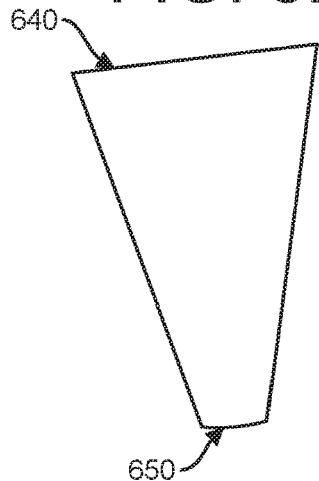
FIG. 6(c) depicts an expanded adjustable earthing coil according to an embodiment of the present invention.
Figure 7A:
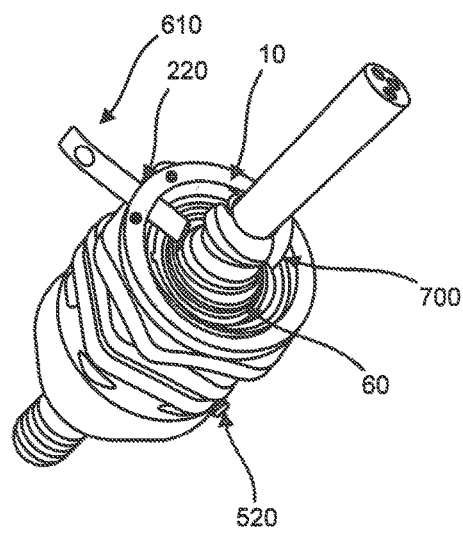
FIGS. 7(a)-7(d) are different perspective views of the assembled cable gland with a cable wire running through it, according to an embodiment of the present invention.
Figure 7B:
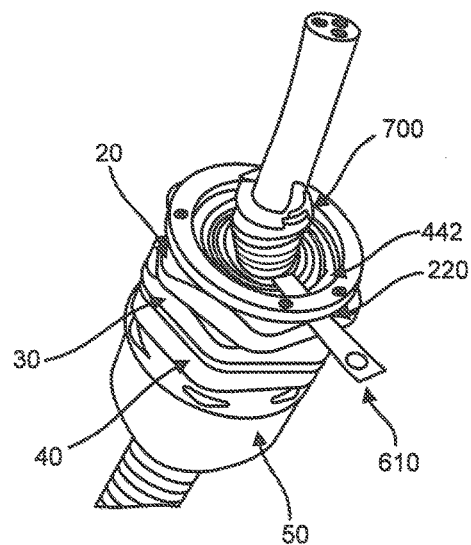
Figure 7C:
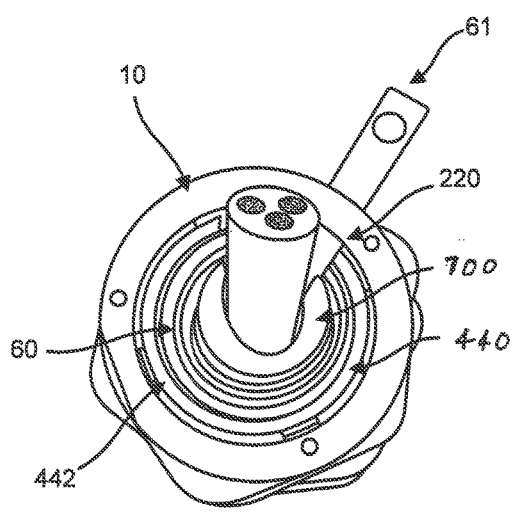
Figure 7D:
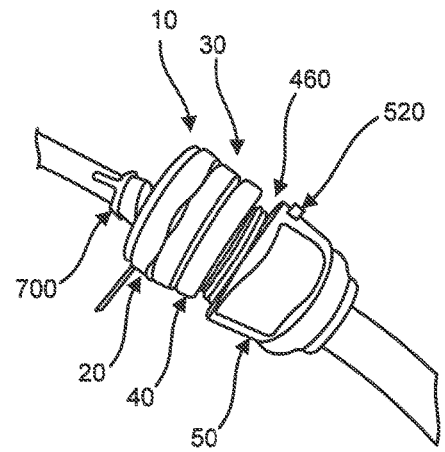

FIG. 6(a) depicts the adjustable earthing coil 60 in a relaxed coiled form, while FIG. 6(c) depicts the adjustable earthing coil 60 in an expanded form. The adjustable earthing coil 60 is a flat, tapered rectangular piece of material that is wound in a circular shape, each coil laying over the previous coil forming a flat curled ribbon. The wider end 640 of the tapered rectangular material forms the inner layer of the coil while the narrower end 650 of the tapered rectangular material forms the outer layer of the coil. A slight bend 620 is formed at the end of the coil and bent in the opposite direction the coil is curled in, and an integrated tab 610 is attached to the adjustable earthing coil 60 at a connection point 630.

Figure 2A:
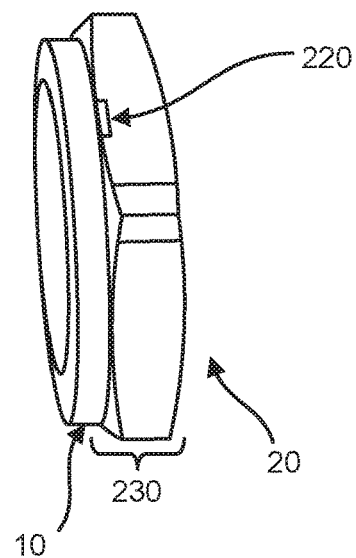
FIG. 2(a) is a perspective view of the double washer combo—i.e. the washer sealant and the second washer—according to an embodiment of the present invention.
Figure 2B:
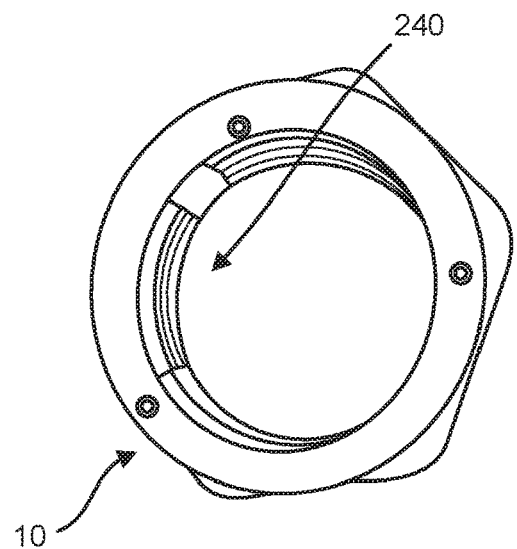
FIG. 2(b) is another perspective view of the double washer combo—i.e. the washer sealant and the second washer—according to an embodiment of the present invention.
Figure 3A:
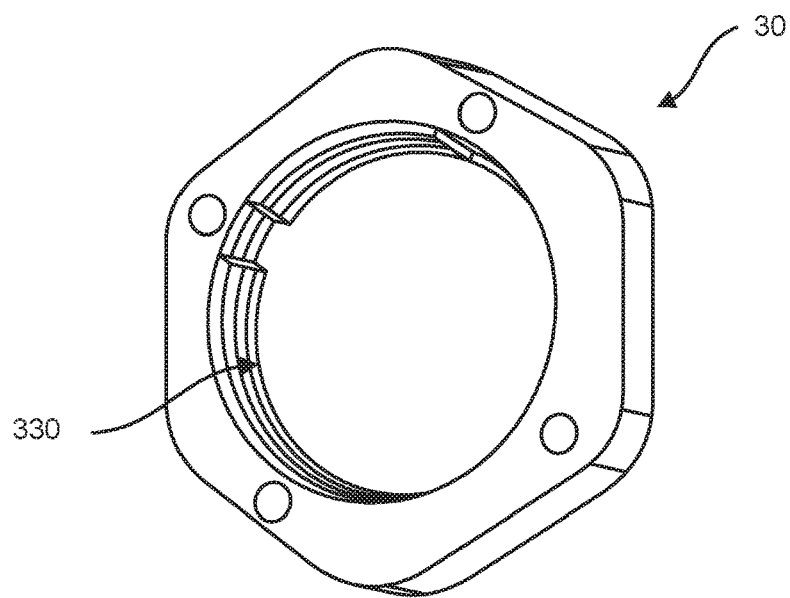
FIG. 3(a) depicts a washer according to an embodiment of the present invention.
Figure 3B:
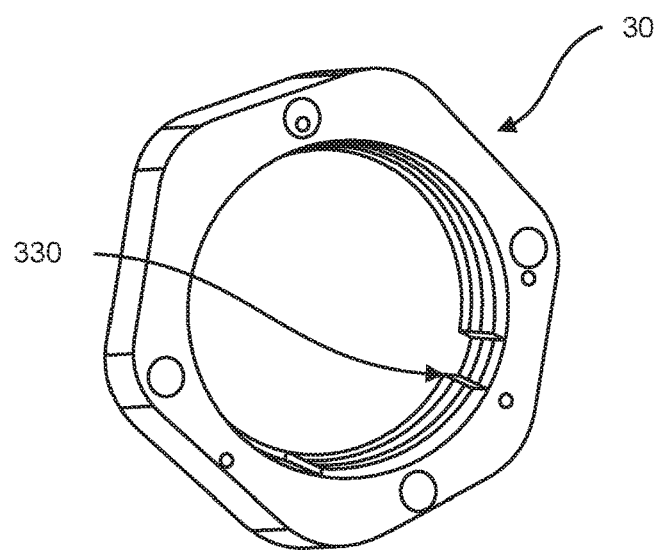
FIG. 3(b) depicts another perspective of the washer according to an embodiment of the present invention.

The adjustable earthing coil 60 is held in place in the cable gland 100 by a double-washer-sealant-combo 230, see FIG. 2. The double-washer-sealant-combo comprises a flat side of the washer sealant 10, abutted to a flat side of second washer 20, leaving no space between the washers, except for a small thin aperture 220. The small thin aperture 220 is a fraction of the circumference of the two washers and drilled between the two abutting washers, from the outside perimeter of both washers through and into the inside perimeter of both washers, at a location along the circumference of the washer sealant 10 and the second washer 20. In an alternate embodiment, the double-washer-sealant-combo comes already manufactured as one component, by way of injection molding.

In an alternate embodiment of the current invention, the adjustable earthing coil 1010 is a flat circular material with an integrated tab 1030 attached to it as well as a star shaped hole 1020 cut through the center of the circular material and pushed out forming a star-shaped hole, see FIG. 10(a)-(e).

Figures 11A, 11B:
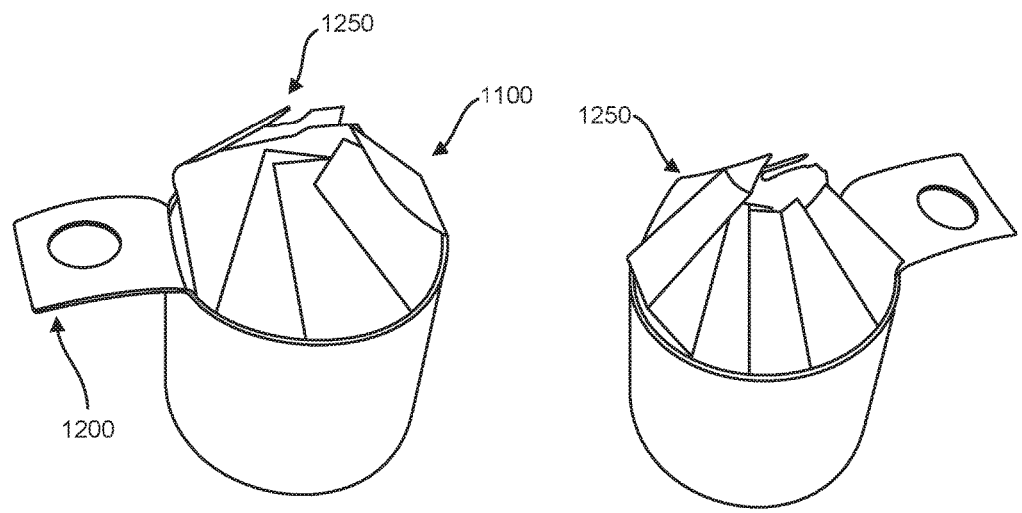
FIGS. 11(a)-(d) are different perspective views of yet another alternate adjustable earthing coil according to another embodiment of the present invention.
Figures 11C, 11D:
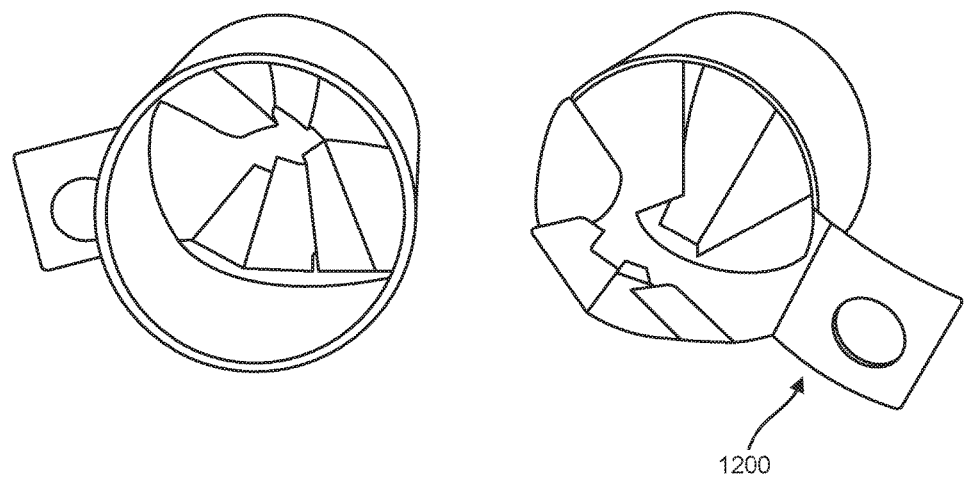
Figure 12:
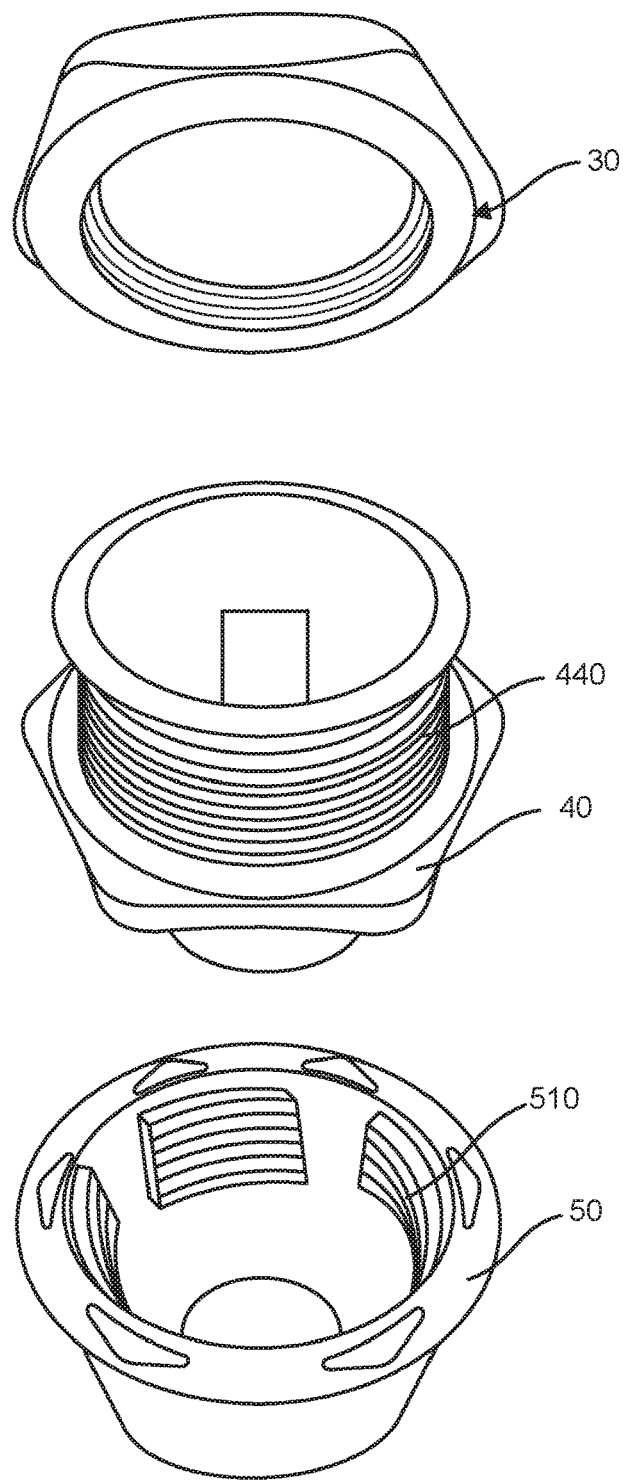
FIG. 12 is a view of the cable gland in a disassembled state according to an embodiment of the present invention.
Figure 13:
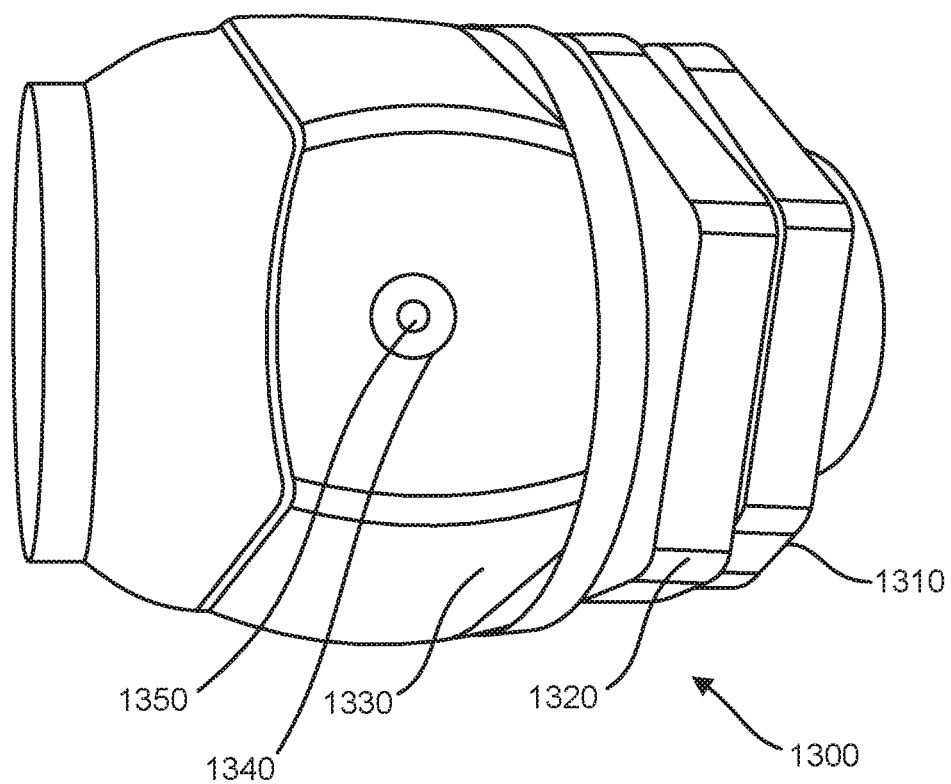
FIG. 13 is a side view of a cable gland according to an embodiment of the present invention.
Figure 14A:
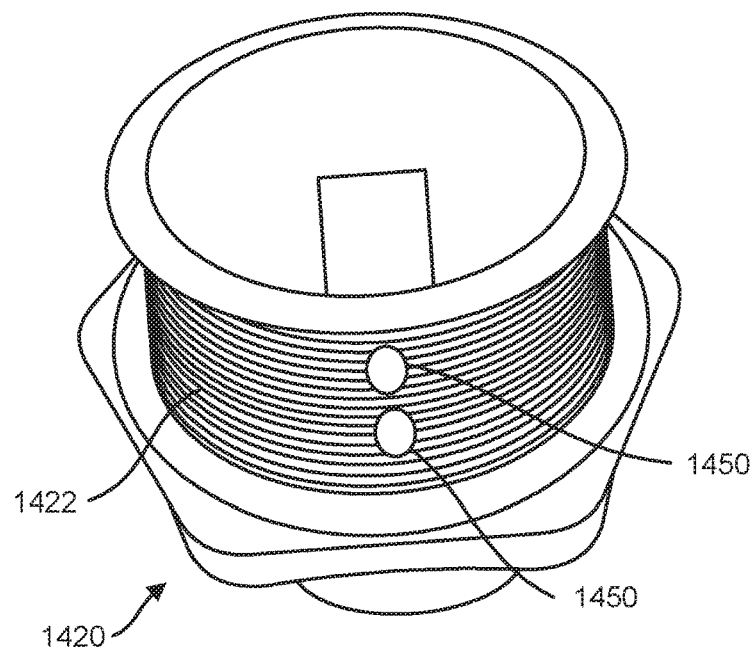
FIGS. 14(a) & (b) are side views a gland body and a cable gland, respectively, according to an embodiment of the present invention.
Figure 14B:
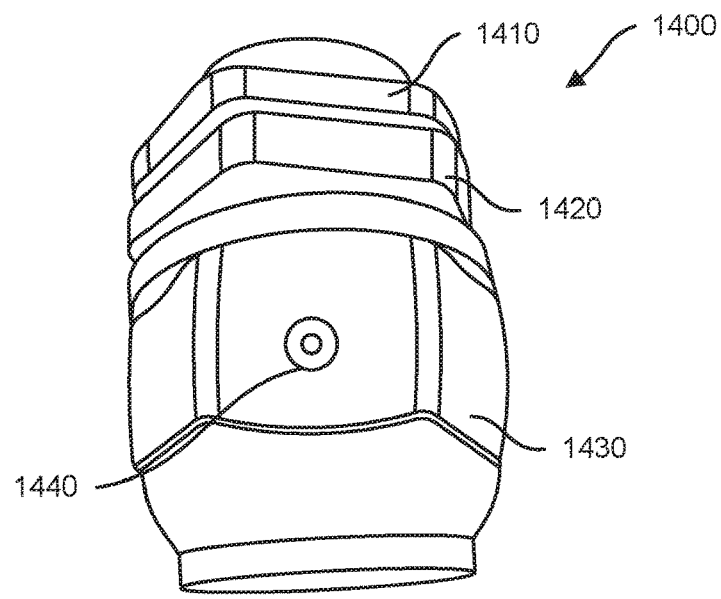

In another embodiment of the current invention, the adjustable earthing coil 1100 is a short cylinder with open end, wherein one end of the cylinder has several cuts made lengthwise towards the opposite end of the cylinder where there are no cuts, forming several flaps 1250, wherein each flap except one is folded approximately 45 degrees towards the opening at the end of the cylinder where the cuts were made, see FIG. 11. The one flap 1200, not folded towards the opening at the end of the cylinder where the cuts were made, is folded outwards approximately 90 degrees in the opposite direction away from the opening at the end of the cylinder where the cuts were made, forming an integrated tab 1200. In another embodiment, each flap except one is folded in the range of approximately 35 to 55 degrees. In another embodiment, the one flap is folded outwards approximately 80-100 degrees in the opposite direction away from the opening at the end of the cylinder where the cuts were made.

In yet another embodiment of the current invention, an adjustable earthing insert 800 is used in the cable gland 108, see FIG. 8(*a*)-8(*c*). The cable gland 108 is comprised of the washer 30, the outer housing 50, the adjustable earthing insert 800, the gland body 40, and the anti-short bushing 700. In an embodiment of the current invention, cable gland 108 further comprises a release mechanism 420 on the gland body 40, see FIG. 4(*c*), and a release mechanism 520 on the outer housing 50, see FIG. 5 (*a*).

Figure 16:
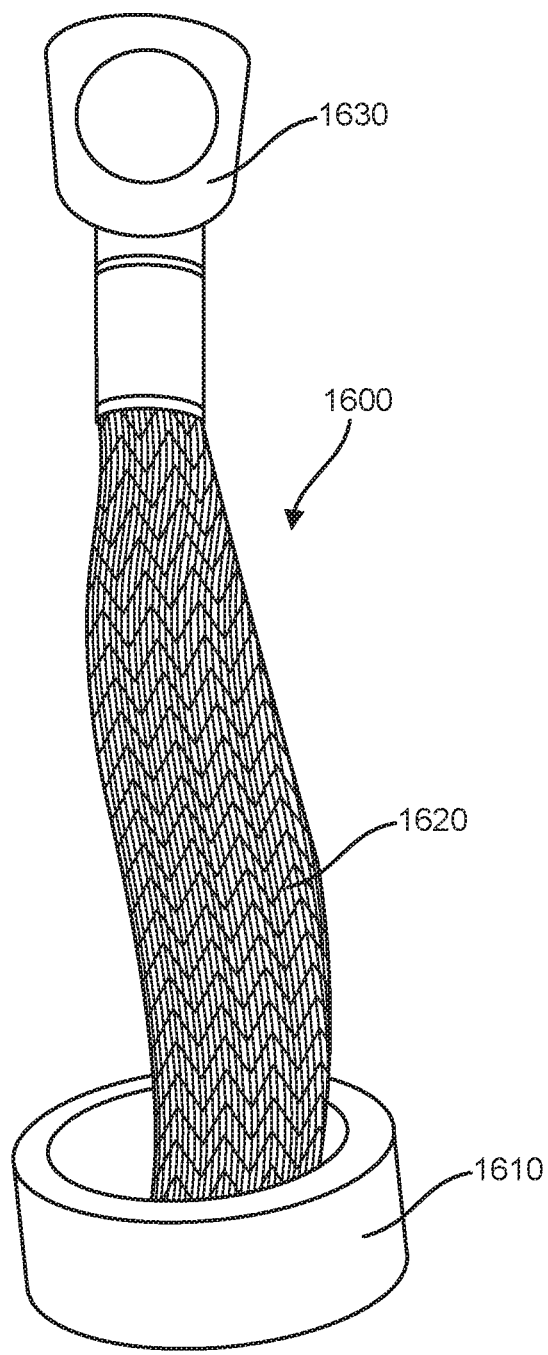
FIG. 16 is front view of constant force spring, an earthing strap, and an integrated tab, according to an embodiment of the present invention.

In an embodiment, the adjustable earthing insert 800 is comprised of a constant force spring 860 which is further comprised of a flat, rectangular piece of material that is wound in a circular shape along the inside perimeter of a cable clamp insert, each coil wrapping around the previous coil forming a flat curled ribbon. In an embodiment, the constant force spring 860 is mechanically attached to the cable clamp insert of the adjustable earthing insert 800. In another embodiment, the constant force spring 860 fits into a groove or opening in the cable clamp insert of the adjustable earthing insert 800 and is fixed into place. In another embodiment, an integrated tab 810 is attached to the constant force spring 860 at a connection point. In an embodiment, the integrated tab 810 is attached to the connection point via a mechanical, soldered, or adhesive connection point. In yet another embodiment, an earthing strap 1620 is attached to the integrated tab 810. In an embodiment, an earthing strap 1620 is attached to the constant force spring 860, see FIG. 16. In an embodiment, a first end of the earthing strap 1620 is attached to the integrated tab (not pictured) at a connection point. In another embodiment, the first end of the earthing strap 1620 is attached to the constant force spring 860 at a connection point. In an embodiment the earthing strap 1620 is attached via a mechanical, soldered, or adhesive connection. In an embodiment, the earthing strap 1620 is an earthing braid or earthing cable and is made out of conductive metals. In another embodiment, an anti-short bushing 700 is also attached to the adjustable earthing insert 800. The anti-short bushing 700 is attached to the edge circumference of the constant force spring 860 that comes into contact with a cable that is threaded through the cable gland.

Figures 9A, 9B, 9C:
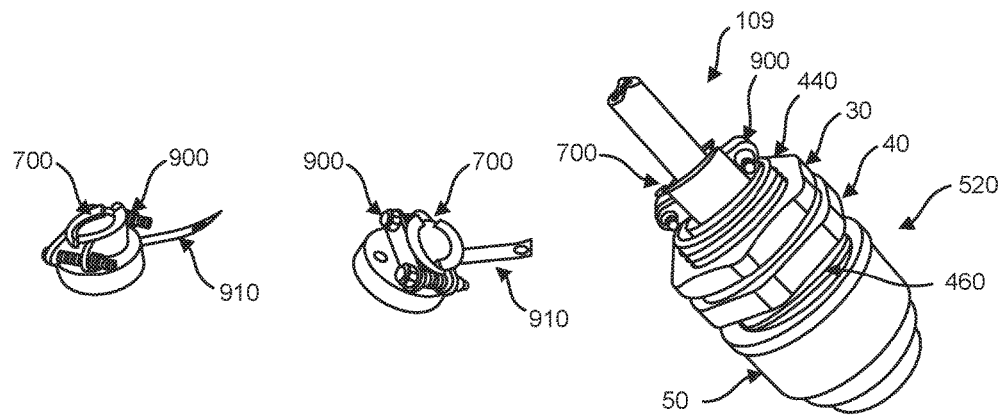
FIGS. 9(a) & 9(b) are two perspective views of an adjustable earthing insert clamp according to an embodiment of the present invention.
FIGS. 9(c)-(e) are different perspective views of the cable gland with the adjustable earthing insert clamp inserted into cable gland and a cable wire running through the cable gland, according to an embodiment of the present invention.
Figures 9D, 9E:
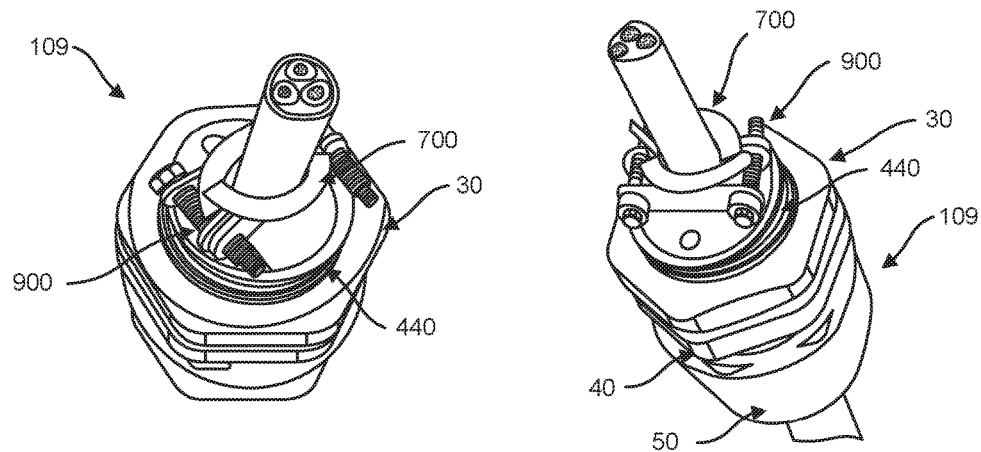
Figures 10A, 10B:
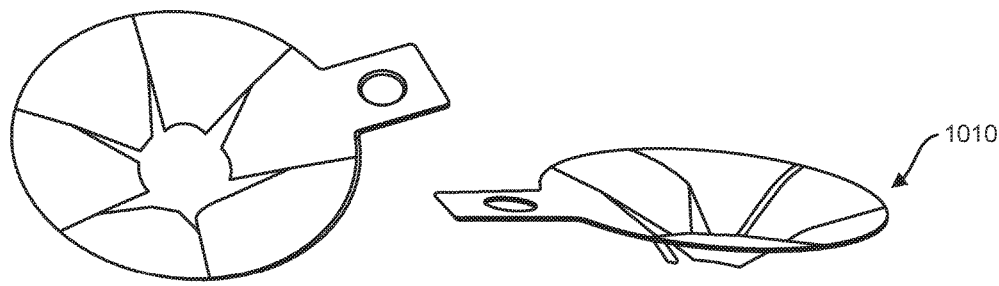
FIGS. 10(a)-(e) are different perspective views of an alternate adjustable earthing coil according to another embodiment of the present invention.
Figures 10C, 10D:
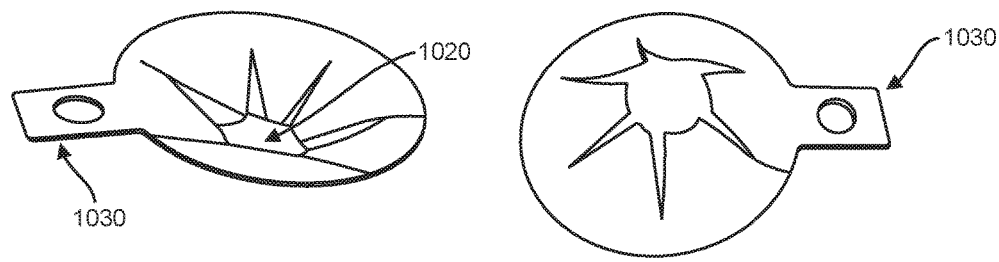
Figure 10E:
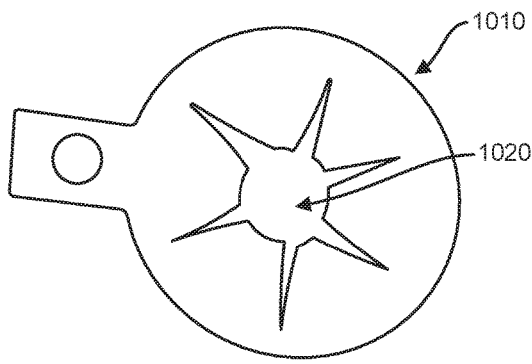

In yet another embodiment of the current invention, an adjustable earthing insert clamp 900 is used in the cable gland 109, see FIG. 9(*a*)-9(*e*). The cable gland 109 is comprised of the washer 30, the outer housing 50, the adjustable earthing insert clamp 900, the gland body 40, and the anti-short bushing 700. In an embodiment of the current invention, cable gland 109 further comprises a release mechanism 420 on the gland body 40, see FIG. 4(*c*), and a release mechanism 520 on the outer housing 50, see FIG. 5 (*a*).

In an embodiment, the adjustable earthing insert clamp 900 is comprised of an adjustable cable insert clamp. In an embodiment, the adjustable earthing insert clamp 900 further comprises an integrated tab 910 attached to the adjustable earthing insert clamp 900 at a connection point. In an embodiment, the integrated tab 910 is attached to the connection point via a mechanical, soldered, or adhesive connection point. In yet another embodiment, the integrated tab 910 is attached to the adjustable earthing insert clamp 900. In an embodiment, an earthing strap 1770 is attached to the adjustable earthing insert clamp 900. In an embodiment, a first end of the earthing strap 1760 is attached to the integrated tab 910 at a connection point. In another embodiment, the first end of the earthing strap 1760 is attached to the adjustable earthing insert clamp 900 at a connection point. In an embodiment the earthing strap is attached via a mechanical, soldered, or adhesive connection. In an embodiment, the earthing strap is an earthing braid or earthing cable and is made out of conductive metals. In an embodiment, an anti-short bushing 700 is also attached to the adjustable earthing insert clamp 900 to the edge circumference of the clamp 900 that comes into contact with a cable that is threaded through the cable gland.

In one embodiment of the current invention, the cable gland 100 is assembled by connecting the outer housing 50 to the tapered area 480 of the gland body 40 and rotating the outer housing 50 around the first set of threads 460 on the gland body 40. The outer housing 50 is configured to compress the tapered area 480 of the gland body, allowing the sealing connector gland 482 inside the gland body, to tighten around a cable. In an embodiment of the current invention, the release mechanism 420 on the gland body 40 is a spring button. Once the outer housing 50 has been torqued to a predetermined tightness, the aperture 520 in the outer housing 50 will align with the release mechanism 420 on the gland body. The spring button 420 interacts with the aperture 520 on the outer housing 50 and changes from a depressed position to a raised position. The spring button 420 further aids in maintaining the outer housing's 50 location in relation to the gland body 40. In an embodiment, the raised position of the spring button 420 provides a visual indicator that the cable gland 100 has been sufficiently tightened.

In another embodiment of the current invention, the release mechanism 420 on the gland body 40 is one or more apertures in the tapered area 480. The outer housing 50 also has one or more apertures 520. The outer housing 50 interacts with the gland body 40 and is torqued to a predetermined tightness; the one or more apertures 520 in the outer housing 50 are configured to align with the one or more apertures 420 in the gland body 40 and configured to receive at least one set screw. When the apertures align, at least one set screw is installed and holds the outer housing 50 and the gland body 40 together in place. In an embodiment, the at least one set screw serves as a visual indicator that the cable gland 100 has been sufficiently torqued and serves as a visual indicator that the assembly is complete. If a set screw is not properly engaged, the set screw will protrude and an installer can ascertain that the set screw has not been properly engaged or the cable gland 100 has not been sufficiently torqued.

In another embodiment, the at least one set screw will have a dip or a pain bubble on the threads to provide another visual indication as to whether or not the cable gland 100 has been sufficiently torqued. The threads of the at least one set screw is painted a bright color, and when sufficiently tightened, the threads would no longer be visible, thus providing a visual indicator that the cable gland 100 has been sufficiently torqued and the at least one set screw sufficiently tightened. In yet another embodiment, the at least one set screw is hollow with a paint bubble at the end of the threads.

Figure 15:
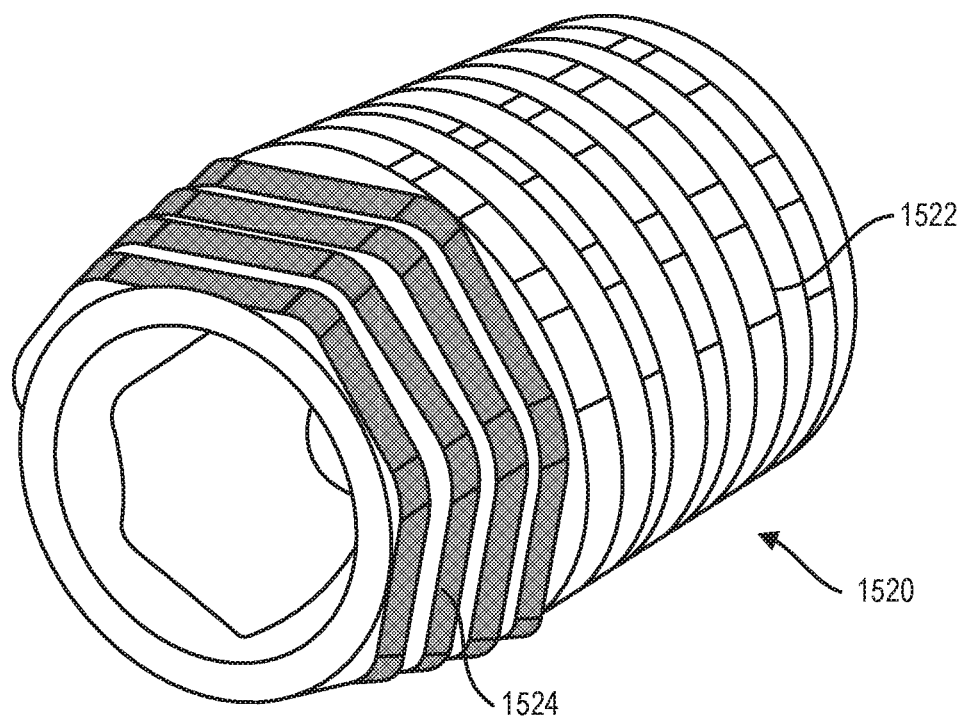
FIG. 15 is a perspective view of a gland body of a cable gland according to yet another embodiment of the present invention.

In another embodiment, the gland body 40 has an alternate method of visually indicating that the cable gland 100 has been sufficiently torqued. Referring to FIG. 15, there is a length 1524 of threads 1522 of the cable body 1520 that is colored. This colored length 1524 corresponds to a minimum tightness that is needed to secure the cable gland 100 to a cable inserted in the cable gland 100. An installer would tighten the outer housing 50 past the colored length 1524. This would serve as a visual indicator that the cable gland 100 has been sufficiently tightened. These colored lengths will vary depending on the outside diameter of the cable.

After sufficiently tightening the cable gland 100 around a cable, the first washer 30 is connected to the gland body 40. In an embodiment, the first washer 30 has threads 330 around the inner circumference of the first washer 30. To connect the first washer 30 to the gland body 40, the threads 330 of the first washer 30 interact with a second set of threads 440 located on the gland body 40. After the first washer 30 is connected to the gland body 40, the double-washer-sealant-combo 230 is connected to the gland body 40. In an embodiment, the double-washer-sealant-combo 230 has threads 240 around the inner circumference of the double-washer-sealant-combo 230. To connect the double-washer-sealant-combo 230 to the gland body 40, these threads 240 also interact with the second set of threads 440 located on the gland body 40. Once the double-washer-sealant-combo 230 is connected to the gland body 40, the adjustable earthing coil 60 is inserted inside the double-washer-sealant-combo 230 and also inside the gland body 40. The adjustable earthing coil 60 is held in place by first inserting the integrated tab 610 of the adjustable earthing coil 60 into the thin aperture 220 in the double-washer-sealant-combo, from the inside circumference of the double-washer-sealant-combo, through the double-washer-sealant-combo, and out, so that the integrated tab 610 protrudes out on the outside of the cable gland 100 while the remainder of the adjustable earthing coil 60 is held in place inside the cable gland 100, see FIG. 7(A)-7(D). The adjustable earthing coil 60 is held in place secondly, when the bend 620 at the end of its coil lodges into the at least one or more grooves 442 in the gland body.

In an embodiment of this invention, the adjustable earthing coil 60 expands and contracts when the bend 620 at the end of the adjustable earthing coil 60 lodges into the at least one or more grooves 442 in the gland body 40 as the double-washer-sealant-combo 230 is rotated around the second set of threads 440 on the gland body 40. The adjustable earthing coil 60 expands as force is applied rotating the double-washer-sealant-combo 230 around the second set of threads 440 on the gland body 40 in the direction opposite of the direction the adjustable earthing coil 60 is coiled. The adjustable earthing coil 60 automatically contracts once the force being applied rotating the double-washer-sealant-combo 230 is released. One that force is released, the adjustable earthing coil 60 immediately contracts and coils back up to its original tightness, snapping firmly around the cable armor, metal-cladding, or metal-sheathing to provide the connection for proper earthing or bonding, that is in the cable gland 100, rotating the double-washer-sealant-combo 230 back in the opposite direction the force was being applied. In an embodiment, an anti-short bushing 700 is connected to the cable to prevent the cable from cutting or shorting over time from repeated expanding or contracting of the adjustable earthing coil 60 or from repeated contact with edges of different parts of the cable gland 100. In an embodiment, the cable gland 100 is made up of a non-metallic material.

In an embodiment of this invention, the adjustable earthing coil 60 is a constant force spring. When the constant force spring is fully rolled up, the constant force spring is relaxed. When the constant force spring is unrolled, a restoring force is generated working to force the constant force spring back into its relaxed rolled up position.

In another embodiment of this invention, the first washer 30 is connected to the gland body 40, and then the adjustable earthing insert 800 is inserted into the gland body 40 of the cable gland 100. In an embodiment, the adjustable earthing insert 800 is held in place first by the firm fit and snap in of the adjustable earthing insert 800 into the gland body 40, and secondly by lodging into the ledge or shelf 446 in the inner circumference of the gland body.

In an embodiment of this invention, the constant force spring 860 in the adjustable earthing insert 800 expands and contracts the constant force spring 860 is rotated around the inside of the adjustable earthing insert 800 and the gland body 40. More specifically the adjustable earthing insert 800 expands as force is applied rotating the constant force spring 860 around the inside of the gland body 40 in the direction opposite of the direction the constant force spring 860 or adjustable earthing coil 60 is coiled. The constant force spring 860 and adjustable earthing coil 60 are similar and can be referenced interchangeably. The constant force spring 860 automatically contracts once the force rotating it is released. One that force is released, the constant force spring immediately contracts and coils back up to its original tightness, snapping firmly around the cable that is in the cable gland 100. In an embodiment, the maximum force generated when the coil is completely rolled out remains constant no matter how many times the coil has been rolled and unrolled. In its relaxed state, the material's inner circumference coil rolls up to as small as the circumference smallest available cable diameter. In another embodiment, the material's inner circumference coil rolls up to as small as approximately 2-4 millimeters.

In an embodiment, the adjustable earthing coil 60 serves as the electrical connection point to a cable. The integrated tab 610 serves as a connection point between the adjustable earthing coil 60 and an earthing strap 1620, see FIG. 16. The earthing strap 1620 is attached to integrated tab 610 of the adjustable earthing coil 60 at a first end of the earthing strap 1620. The second end 1630 of the earthing strap 1620 is attached to an earthing or bonding point of an electrical equipment. In an embodiment, the earthing strap 1620 is attached to the adjustable earthing coil 60 via a mechanical, soldered, or adhesive connection point creating a single, integrated earthing and bonding device. In an embodiment, the earthing strap 1620 is a braided material or earthing braid or earthing cable and is made out of conductive metals. In an embodiment, the adjustable earthing coil 60 is a constant force spring. In another embodiment of this invention, the adjustable earthing coil 60 is configured to create a spiral cone upwards within the body of the cable gland 100, along the cable inserted in the cable gland 100. The spiral cone of the adjustable earthing coil 60 forms a cone or a sleeve. The sleeve is configured to receive sealant. Alternatively, an independent sleeve is used to receive a sealant. The purpose of the cone or sleeve is to hold the sealant and to inhibit the potential migration of flammable gases or liquids into and through the interior of the cable to an area that has exposed electrical arcing, mitigating a potential explosion. In an embodiment, the sealant is an epoxy, resin, putty, or a different type of sealant.

Figure 17:
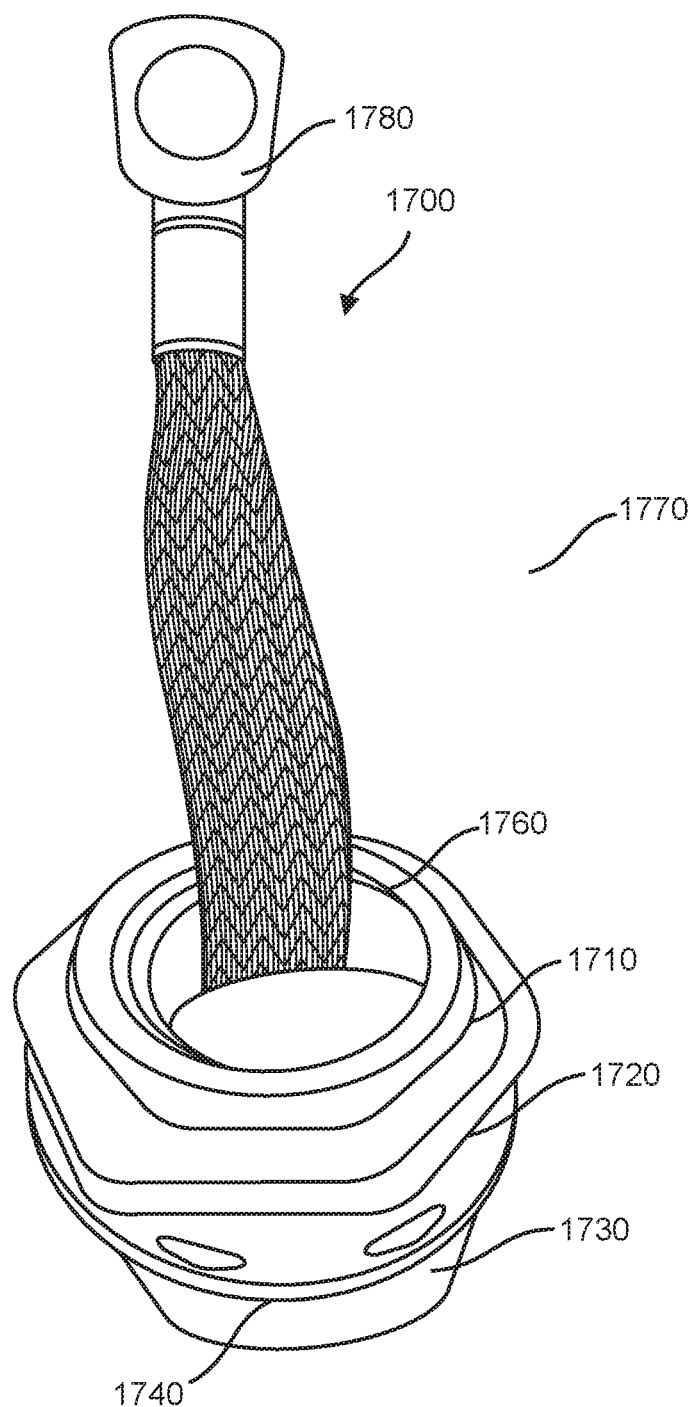
FIG. 17 is a perspective view of a cable gland as it is used with the constant force spring according to yet another embodiment of the present invention.
Figure 18:
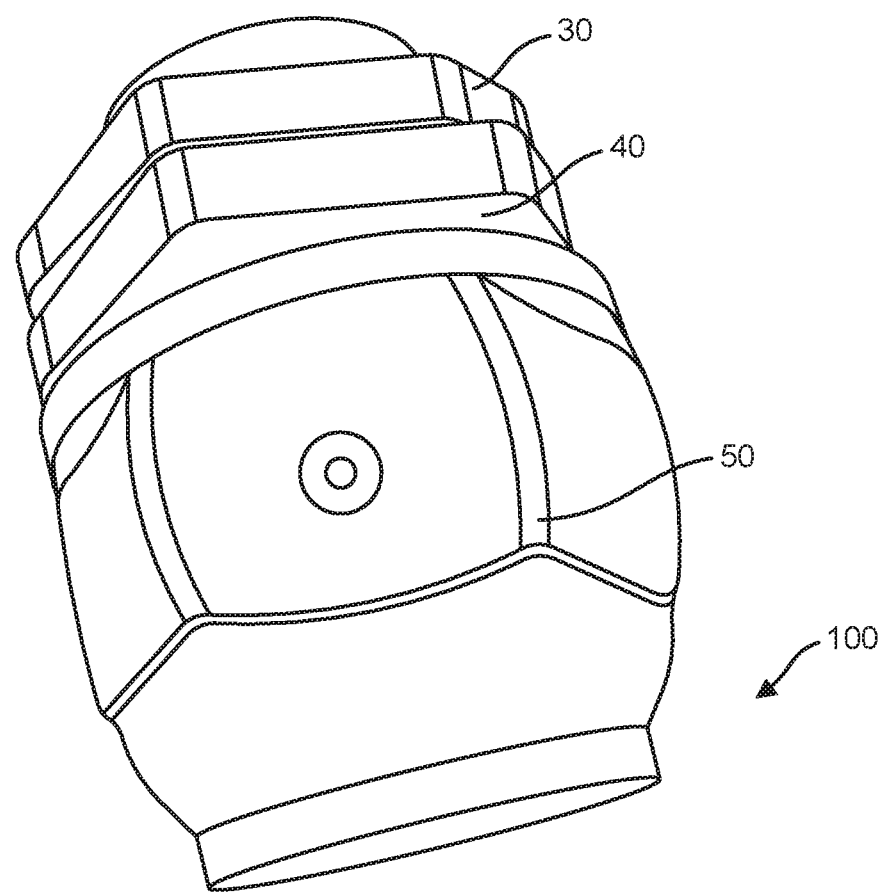
FIG. 18 is a perspective view of an assembled cable gland, according to an embodiment of the present invention.

FIG. 17 shows a fully assembled cable gland 1700 in an embodiment of this invention. The earthing strap 1770 has a first end that is attached to the integrated tab (not pictured) of the adjustable earthing coil 1760 that is fitted inside the gland body 1720, and a second end 1760 that will be attached to the earthing or bonding point of an electrical equipment. In an embodiment of this invention, the adjustable earthing coil 1760 extends along the cable inserted in the cable gland 1700, and forms a cone or a sleeve. The sleeve is configured to receive epoxy or a different type of sealant. Alternatively, an independent sleeve is used to receive a sealant.

In an embodiment of this invention, a method for grounding a cable passing through the cable gland 100 that is comprised of a washer sealant 10, a second washer 20, a first washer 30, an adjustable earthing coil 60, an outer housing 50, a gland body 40; wherein the gland body 40 comprises a sealing connector 482 disposed in the gland body 40, a tapered area 480 to be received in the outer housing 50, and a first set of threads 460 adjacent to the tapered area on the gland body; wherein the outer housing has one or more apertures; comprises the steps of:

1) inserting the adjustable earthing coil 60 in one end of the assembled cable gland 100, allowing an integrated tab 610 attached to the adjustable earthing coil 60 to protrude out of the cable gland 100;
2) opening cable receiving apertures at each end of the cable gland 100;
3) expanding the adjustable earthing coil 60 to a circumference wide enough to receive a cable;
4) inserting the cable through a first aperture in the cable gland 100, threading the cable through the cable gland 100, and out of a second aperture in the cable gland 100;
5) tightening the cable receiving aperture that is opposite of the end where the adjustable earthing coil 60 was inserted, tight enough to hold and secure the cable gland 100 in place on the cable;
6) inserting an anti-short bushing 700 around the cable in the area that will interact with the adjustable earthing coil 60;
7) contracting the adjustable earthing coil 60 inside the cable gland 100 so that it tightens around the cable in the area on the cable that is exposed for grounding; and
8) connecting the adjustable earthing coil 60 to a grounding element outside of the cable gland 100.

In an embodiment of this invention, the method of expanding the adjustable earthing coil 60 comprises lodging the end of the adjustable earthing coil 60 into at least one or more grooves 442 in the gland body 40 of the cable gland 100 and rotating the cable gland in the direction opposite of the direction the adjustable earthing coil is curled in.

In an embodiment of this invention, the method of tightening the end of the cable gland 100 that is opposite to where the adjustable earthing coil 60 is inserted comprises rotating the outer housing 50 of the cable gland 100 around the first set of threads 460.

In an embodiment of this invention, the method of contracting the adjustable earthing coil 60 comprises lodging the end of the adjustable earthing coil 60 into the at least one or more grooves 442 in the gland body 40 of the cable gland 100 and releasing and pressure being applied to the adjustable earthing coil 60 that is forcing it to rotate in the direction opposite of the direction the adjustable earthing coil 60 is curled in. In another embodiment one or more grooves 442 are in the gland body. In another embodiment the grooves are comprised of different shapes, depths, and widths.

In another embodiment, the method of contracting the adjustable earthing coil 60 comprises lodging the end of the adjustable earthing coil 60 into the at least one or more grooves 442 in the gland body 40 of the cable gland 100 and rotating second washer 20 around the second set of threads 440 on the cable gland 100, in the same direction that the adjustable earthing coil 60 is curled in.

In another embodiment of this invention, the method of connecting the adjustable earthing coil 60 to a grounding element outside the cable gland 100 comprises attaching a first end of an earthing strap 1620 to an integrated tab 610 that is attached to the adjustable earthing coil 60, and attaching the second end of the earthing strap 1630 to an earthing point outside the cable gland 100.

In another embodiment of this invention, the method of connecting the adjustable earthing coil 60 to a grounding element outside the cable gland 100 comprises attaching the first end of an earthing strap 1620 to the adjustable earthing coil 60 via a mechanical, soldered, or adhesive connection point creating a single, integrated earthing and bonding device, and attaching the second end of the earthing strap 1630 to an earthing point outside the cable gland 100.

Having thus described the disclosed subject matter, what is claimed is:

1. A cable gland comprising:
    a gland body;
    an outer housing externally connected to one end of the gland body;
    a first washer arranged externally on the gland body;
    a second washer arranged externally on the gland body;
    a washer sealant arranged externally on the gland body;
    and an adjustable earthing coil arranged internally in the gland body;
    wherein the gland body comprises:
        a sealing connector disposed in the gland body;
        a tapered area to be received by the outer housing; and
        a first set of threads adjacent to the tapered area on the gland body;
    wherein the outer housing has one or more apertures; and
    wherein, the outer housing, once connected to the gland body, and rotated around the first set of threads on the gland body, is configured to compress the tapered area, allowing the sealing connector to tighten around a cable.

2. The cable gland of claim 1, further comprising a release mechanism on the gland body.

3. The cable gland of claim 2, wherein the release mechanism is a spring button.

4. The cable gland of claim 2, wherein the release mechanism is one or more apertures in the tapered area.

5. The cable gland of claim 4, wherein the apertures in the outer housing and gland body are configured to align once connected, and to receive at least one set screw.

6. The cable gland of claim 1, wherein a portion of the length of the first set of threads on the gland body are colored.

7. The cable gland of claim 1, wherein the adjustable earthing coil is a flat, tapered rectangular piece of material that is wound in a circular shape, each coil laying over the previous coil forming a flat curled ribbon, with the wider end of the tapered rectangular material forming the inner layer of the coil while the narrower end forms the outer layer of the coil, with the end of the outer layer of coil forming a slight bend in the opposite direction the coil is curled in.

8. The cable gland of claim 7 wherein an integrated tab is attached to the adjustable earthing coil.

9. The cable gland of claim 8, further comprising a double-washer-sealant-combo which comprises: one flat side of the washer sealant, abutted to one flat side of the second washer, leaving no space between the washers except for a small thin aperture, a fraction of the circumference of the washers, drilled between the two washers, from the outside perimeter of both washers through and into the inside perimeter of both washers, at a location along the circumference of both the washer sealant and second washer.

10. The cable gland of claim 9, wherein the first washer is first arranged on a second set of threads on the gland body, then the double-washer-sealant-combo is arranged on the second set of threads on the gland body, then the adjustable earthing coil is inserted inside the double-washer-sealant-combo and held in place by inserting the integrated tab of the adjustable earthing coil, through the thin aperture in the double-washer-sealant-combo.

11. The cable gland of claim 10, wherein the adjustable earthing coil expands and contracts when the bend at the end of the adjustable earthing coil lodges into groove in the gland body as the double-washer-sealant-combo is rotated around a second set of threads on the gland body.

12. The cable gland of claim 11, wherein the adjustable earthing coil expands as the double-washer-sealant-combo is rotated around the second set of threads on the gland body in one direction, and contracts as the double-washer-sealant-combo is rotated around the second set of threads on the gland body in the opposite direction.

13. The cable gland of claim 1, further comprising an anti-short bushing connected to a cable that is inserted in the cable gland.

14. The cable gland of claim 1, wherein the adjustable earthing coil is a flat circular material with an integrated tab attached to it as well as a star shaped hole cut through the center of the circular material and pushed out forming a star-shaped hole in the center of the circular material.

15. The cable gland of claim 1, wherein the adjustable earthing coil is a short cylinder with opens ends, wherein one end of the cylinder has several equal spaced cuts made towards the opposite end of the cylinder where there are no cuts, forming several flaps, wherein each flap except one, is folded 45 degrees towards the opening at the end of the cylinder where the cuts were made, wherein the one flap that was not folded towards the opening at the end of the cylinder where the cuts were made, is folded outwards 90 degrees in the opposite direction away from the opening at the end of the cylinder where the cuts were made, forming an integrated tab to be used for grounding the cable connector.

16. The cable gland of claim 1, wherein the gland body further comprises an independent sleeve inserted to receive a sealant.

17. The cable gland of claim 16, wherein the sealant comprises an epoxy.

18. The cable gland of claim 1, wherein the cable gland is made up of a non-metallic material.

19. A method for grounding a cable passing through a cable gland comprised of a washer sealant, a second washer, a first washer, an adjustable earthing coil, an outer housing, and a gland body; wherein the gland body comprises a sealing connector disposed in the gland body, a tapered area to be received in the outer housing, and a first set of threads adjacent to the tapered area on the gland body; and wherein the outer housing has one or more apertures; comprises the steps of:
    inserting the adjustable earthing coil in one end of the cable gland, allowing an integrated tab attached to the adjustable earthing coil to protrude out of the cable gland;
    opening cable receiving apertures at each end of the cable gland;
    expanding the adjustable earthing coil to a circumference wide enough to receive a cable;
    inserting the cable through a first aperture in the cable gland, threading the cable through the cable gland, and out of a second aperture in the cable gland;
    tightening the cable receiving aperture that is opposite of the end where the adjustable earthing coil was inserted, tight enough to hold and secure the cable gland in place on the cable;
    inserting an anti-short bushing around the cable in the area that will interact with the adjustable earthing coil;
    contracting the adjustable earthing coil inside the cable gland so that it tightens around the cable in the area on the cable that is exposed for grounding; and
    connecting the adjustable earthing coil to a grounding element outside of the cable gland.

20. The method of claim 19, wherein inserting the adjustable earthing coil comprises:
    inserting the adjustable earthing coil in between two washers at one end of the cable gland; and
    rotating the adjustable earthing coil so that the end of the coil lodges into at least one or more grooves in the body of the cable gland.

21. The method of claim 19, wherein expanding the adjustable earthing coil comprises lodging the end of the adjustable earthing coil into the at least one or more grooves in the gland body of the cable gland and rotating the cable gland in the direction opposite of the direction the adjustable earthing coil is curled in.

22. The method of claim 19, wherein tightening the end of the cable gland opposite to where the adjustable ground coil is inserted comprises rotating the outer housing of the cable gland around the first set of threads adjacent to the tapered area on the gland body.

23. The method of claim 19, wherein contracting the adjustable earthing coil comprises lodging the end of the adjustable earthing coil into the at least one or more grooves in the gland body of the cable gland and releasing any pressure being applied to the adjustable earthing coil that is forcing it to rotate in the direction opposite of the direction the adjustable earthing coil is curled in.

24. The method of claim 19, wherein contracting the adjustable earthing coil comprises lodging the end of the adjustable earthing coil into at least one or more grooves in the gland body of the cable gland and rotating the second washer around a second set of threads on the gland body in the same direction that the adjustable earthing coil is curled in.

25. The method of clam 24, wherein contracting the adjustable earthing coil further comprises extending the coil along the inside of the cable gland forming a sleeve configured to receive a sealant.

26. The method of clam 19, wherein connecting the adjustable earthing coil to a grounding element outside the cable gland comprises attaching a first end of an earthing strap to an integrated tab that is attached to the adjustable earthing coil, and attaching the second end of the earthing strap to an earthing point outside the cable gland.

27. The method of claim 19, wherein connecting the adjustable earthing coil to a grounding element outside the cable gland comprises attaching a first end of an earthing strap to the adjustable earthing coil and attaching the second end of the earthing strap to an earthing point outside the cable gland.

* * * * *